United States Patent Office 3,227,566
Patented Jan. 4, 1966

3,227,566
REFRACTORY MATERIALS
Raymond Frederick Hilton, Earlswood, Redhill, Surrey, and Perry Goodman, Cleveland Terrace, London, England, assignors to Morganite Research and Development Limited, London, England, a British company
No Drawing. Filed May 6, 1963, Ser. No. 278,454
Claims priority, application Great Britain, May 10, 1962, 18,021/62
7 Claims. (Cl. 106—56)

This invention relates to a process for the production of refractory materials and to materials so produced. More particularly it relates to those refractory materials which are referred to as carbon-bonded and which are produced by a process which comprises firing a mixture of graphite, silicon carbide and silicon and/or ferrosilicon bonded together with a suitable carbon-yielding binder such as pitch, tar or the like.

It has been found that a refractory material of improved properties may be obtained by carrying out the firing of a mixture of the type described under particular conditions which are more fully described below.

According to the present invention there is provided, in a process for the production of a refractory material by firing a shaped mixture of graphite, silicon carbide, silicon and/or ferrosilicon, bonded with a suitable carbon yielding binder such as pitch, tar or a mixture of pitch and tar oils or like material and allowing the material to cool, the steps of initially heating the shaped mixture in a non-oxidising nitrogen-containing atmosphere to a temperature within the range of 1150–1350° C., maintaining the mixture at this temperature for a substantial length of time, preferably not in excess of 24 hours, rapidly increasing the temperature to 1400 to 1550° C. over a comparatively short period of time, preferably less than 1 hour, and maintaining this temperature for a short period of time, preferably 15–30 minutes.

The invention includes refractory materials when made by the above process.

The graphite which is used in the production of the shaped mixture is preferably flake graphite, although other forms of graphite may be used. Preferably the mixture which is fired is prepared from a blend of flake graphite, silicon carbide, silicon and/or ferrosilicon in which the components are present within the proportions by weight indicated below:

| | Percent |
|---|---|
| Flake graphite | 20–60 |
| Silicon carbide | 20–65 |
| Silicon and/or ferrosilicon | 5–50 |

This blend is then preferably mixed with the binder in an approximate ratio of 100 parts by weight of the blend to 15 to 35 parts by weight of the binder and is then shaped and fired.

The non-oxidising nitrogen-containing atmosphere in which firing is effected according to the process of the invention may be provided by effecting the process in an atmosphere of nitrogen or in an atmosphere of a nitrogen-yielding compound for example ammonia.

The temperature to which the shaped body is initially heated is preferably of the order of 1200–1300° C., in particular approximately 1250° C. whilst the temperature to which it is then heated is of the order of 1425 to 1500° C. preferably 1450° C.

The proportions of the constituents of the mixture being fired are, as indicated above, preferably within certain ranges. By variation of the proportions refractory materials having differing properties may be produced so that one may produce a range of materials having properties adapted for particular uses.

Particularly preferred proportions are indicated below:

| | Percent |
|---|---|
| Flake graphite | 25–40 |
| Silicon carbide | 30–55 |
| Silicon and/or ferrosilicon | 10–25 |

A fluorine-containing material such as fluorspar, cryolite or topaz may be added to the mixture to be fired for example in an amount of up to 1%. Borax, boric acid, glaze frit or a similar glassy material may also be added to the mixture to be fired, in a proportion of, for example, up to about 5%.

Finely divided carbon may also be added to the mixture to be fired in a proportion of up to about 10%.

The shaping of the mixture before firing may be carried out in any convenient manner, for example by pressing, tamping, spinning or other suitable method.

In order that the invention may be more fully understood, the following example is given, by way of illustration only:

Example

Blend together the following ingredients:

| | Percent |
|---|---|
| Flake graphite, 14 to 60 mesh BSS | 33 |
| Refractory grade silicon carbide, sieved through 52 mesh BSS | 55 |
| Ferrosilicon (containing 75% silicon) ground to pass 170 mesh BSS | 12 |

100 parts of the above mixture are thoroughly mixed with 25 parts of tar having a specific gravity of 1.25 and an E.V.T. of 53° C. The resultant mixture is suitable for shaping into articles by pressing or tamping. The resultant shaped product is then fired in an atmosphere of nitrogen to a temperature of 1250° C., maintained at that temperature for 20 hours, raised to 1450° C. in under one hour, maintained at that temperature for 7 minutes and then allowed to cool naturally, still in an atmosphere of nitrogen.

The refractory material so produced has an improved thermal conductivity as well as improved resistance to (a) thermal shock and (b) to attack by molten slags as compared to a conventional carbon-bonded refractory material.

We claim:
1. In a process for the production of a refractory material by firing a shaped mixture comprising a blend of from 20–60% by weight of flake graphite, from 20–65% by weight of silicon carbide and from 5–50% by weight of a material selected from the group consisting of silicon and ferrosilicon, said blend being bonded with a carbon-yielding binder in a ratio of 15–35 parts by weight of binder per 100 parts by weight of blend and allowing the material to cool, the steps of initially heating the shaped mixture in a non-oxidising nitrogen-containing atmosphere to a temperature within the range of 1150–1350° C., maintaining the mixture at this temperature for a period of time not exceeding 24 hours, rapidly increasing the temperature to 1400–1550° C. over a period of time not exceeding 1 hour and maintaining this temperature for about 15 to 30 minutes.

2. In a process for the production of a refractory material by firing a shaped mixture comprising a blend of from 20–60% by weight of flake graphite, from 20–65% by weight of silicon carbide and from 5–50% by weight of a material selected from the group consisting of silicon and ferrosilicon, said blend being bonded with a carbon-yielding binder in a ratio of 15–35 parts by weight of binder per 100 parts by weight of blend and allowing the material to cool, the steps of initially heating the shaped mixture in a non-oxidising nitrogen-containing atmosphere to a temperature of from 1200–1300° C., maintaining the mixture at this temperature for a substantial time but not in excess of 24 hours, rapidly increasing the temperature to 1425–1500° C. in less than one hour, and maintaining the mixture at this temperature for 15–30 minutes.

3. A process as claimed in claim 2 in which the shaped body is initially heated to a temperature of about 1250° C. and then to a temperature of about 1450° C.

4. A process as claimed in claim 2 in which the carbon-yielding binder is selected from the group consisting of pitch, tar and tar oils.

5. A process as claimed in claim 2 in which the mixture to be fired contains up to 1% of a fluorine-containing material selected from the group consisting of fluorspar, cryolite and topaz.

6. A process as claimed in claim 2 in which the mixture to be fired contains up to 5% of a glassy material selected from the group consisting of borax, and boric acid.

7. A process as claimed in claim 1 in which the mixture to be fired contains up to about 10% of finely divided carbon.

References Cited by the Examiner
UNITED STATES PATENTS

| | | | |
|---|---|---|---|
| 1,483,507 | 2/1924 | Brockbank | 106—44 |
| 2,104,841 | 1/1938 | White | 106—56 |
| 2,897,572 | 8/1959 | Hansen | 106—44 |

TOBIAS E. LEVOW, *Primary Examiner.*